US009338670B2

(12) United States Patent
Berberana et al.

(10) Patent No.: US 9,338,670 B2
(45) Date of Patent: May 10, 2016

(54) METHOD, SYSTEM AND COMPUTER PROGRAM FOR CANCELLING UPLINK INTERFERENCE IN A WIRELESS NETWORK (71) Applicant: TELEFONICA, S.A., Madrid (ES)

(72) Inventors: Ignacio Berberana, Madrid (ES); Maria Teresa Aparicio, Madrid (ES); Ana Villanua, Madrid (ES)

(73) Assignee: Telefonica, S.A., Madrid (ES)

( * ) Notice: Subject to any disclaimer, the term of this patent is extended or adjusted under 35 U.S.C. 154(b) by 264 days.

(21) Appl. No.: 14/190,871

(22) Filed: Feb. 26, 2014

(65) Prior Publication Data
US 2014/0241245 A1    Aug. 28, 2014

(30) Foreign Application Priority Data

Feb. 27, 2013  (EP) .................................... 13382061

(51) Int. Cl.
*H04W 24/02* (2009.01)
*H04J 11/00* (2006.01)

(52) U.S. Cl.
CPC ........... *H04W 24/02* (2013.01); *H04J 11/0056* (2013.01)

(58) Field of Classification Search
None
See application file for complete search history.

(56) References Cited

U.S. PATENT DOCUMENTS

| | | | | |
|---|---|---|---|---|
| 8,570,993 B2* | 10/2013 | Austin | .................... | H04W 4/02 370/338 |
| 2009/0197631 A1* | 8/2009 | Palanki | ............. | H04W 72/0413 455/522 |
| 2009/0291640 A1* | 11/2009 | Bhattad | ............. | H04W 72/0406 455/63.1 |
| 2009/0296635 A1* | 12/2009 | Hui | ....................... | H04W 48/10 370/328 |
| 2010/0009705 A1* | 1/2010 | Budianu | ............... | H04L 1/1812 455/501 |
| 2011/0098054 A1* | 4/2011 | Gorokhov | .............. | H04B 7/024 455/452.1 |
| 2012/0066035 A1* | 3/2012 | Stanger | .............. | G06Q 30/0207 705/14.1 |
| 2012/0088532 A1* | 4/2012 | Thomas | ................ | H04W 48/08 455/509 |
| 2012/0135743 A1* | 5/2012 | Ebiko | ................. | H04W 72/082 455/452.2 |
| 2012/0258730 A1* | 10/2012 | Tinnakornsrisuphap | | G01S 5/0215 455/456.1 |
| 2013/0039194 A1* | 2/2013 | Siomina | .............. | H04W 52/244 370/252 |
| 2013/0114454 A1* | 5/2013 | Hwang | .................. | B65G 51/00 370/252 |
| 2013/0225197 A1* | 8/2013 | McGregor | .............. | G01S 1/042 455/456.1 |
| 2014/0098773 A1* | 4/2014 | Yoo | ...................... | H04B 7/0678 370/329 |

(Continued)

FOREIGN PATENT DOCUMENTS

WO    2011/147267 A1    12/2011

OTHER PUBLICATIONS

"SIC-based ICIC in heterogeneous network", LG Electronics, Jan. 18, 2010, pp. 1-4, XP002636256.

*Primary Examiner* — Dung B Huynh
(74) *Attorney, Agent, or Firm* — Sughrue Mion, PLLC (57) ABSTRACT

The method comprising measuring by an interfered base station (BS2) the uplink interference and when said uplink interference exceeds a given threshold performing a cancellation process by: discovering and identifying a serving base station (BS1) to which an interfering user device (UE1) is wirelessly connected; requesting to the serving (BS1) the RF fingerprints of the one or more interfering user devices served thereby and using the same frequency resource blocks (RB) of said interfered (BS2); receiving the RF fingerprint of said interfering user device (UE1); consulting said received RF fingerprint in a register; selecting the RF fingerprint more similar to the received one and taking the information of level of interference associated thereto; and using said taken level of interference information for performing said cancelling of said uplink interference.

14 Claims, 7 Drawing Sheets

(56) References Cited

U.S. PATENT DOCUMENTS

| | | | | |
|---|---|---|---|---|
| 2014/0162660 A1* | 6/2014 | Loborg | H04W 36/0061 | 455/438 |
| 2014/0171097 A1* | 6/2014 | Fischer | H04W 4/02 | 455/456.1 |
| 2014/0220982 A1* | 8/2014 | Jung | H04W 8/26 | 455/437 |
| 2014/0241260 A1* | 8/2014 | Schmidt | H04W 76/023 | 370/329 |
| 2014/0286219 A1* | 9/2014 | Siomina | H04J 11/0023 | 370/311 |
| 2014/0301216 A1* | 10/2014 | Immendorf | H04W 24/08 | 370/252 |
| 2014/0307687 A1* | 10/2014 | Fujishiro | H04W 16/16 | 370/329 |
| 2014/0334440 A1* | 11/2014 | Wong | H04W 36/0011 | 370/331 |
| 2014/0335879 A1* | 11/2014 | Immendorf | H04W 72/082 | 455/452.1 |
| 2015/0016561 A1* | 1/2015 | Negus | H04W 24/02 | 375/267 |
| 2015/0105067 A1* | 4/2015 | Valliappan | H04W 74/0808 | 455/424 |

* cited by examiner

METHOD, SYSTEM AND COMPUTER PROGRAM FOR CANCELLING UPLINK INTERFERENCE IN A WIRELESS NETWORK

CROSS REFERENCE TO RELATED APPLICATIONS

This application is claims priority from European Patent Application No. 13382061.3, filed Feb. 27, 2013, the contents of all of which are incorporated herein by reference in their entirety.

FIELD OF THE ART

The present invention generally relates to wireless communication, and more particularly to a method and system for cancelling the uplink interference in a wireless network.

The invention refers also to a computer program product configured to perform some of the steps of the proposed method for cancelling said uplink interference.

PRIOR STATE OF THE ART

One of the expected ways to improve the performance of wireless mobile systems in areas where the interference is the limiting factor is the use of advanced receivers that support interference cancellation (IC) techniques. For the implementation of interference cancellation (e.g., when implementing Successive Interference Cancellation (SIC), based in the principle of detect, decode and cancel a strong interferer and continue in the same way until desired signal can be decoded), it is sometimes necessary that the receiver is able to properly estimate the interfering channel and is aware of the modulation and coding scheme used by the interferer (other information, like the scrambling code used, may be also required).

In some cases, the information required for IC implementation is naturally available at the receiver. This is the case, for example, of intra-cell multi user Multiple Input Multiple Output (MIMO) (MU-MIMO), where the spatial multiplexing of streams from different UEs is carried out. The receiving base station (BS) is aware of the modulation and coding scheme used by each UE and can apply the SIC principle. Also, the signals arrive to the receiver synchronized and the Reference Signals used for channel estimation (DM-RS) are guaranteed to use different cyclic shifts, so they remain orthogonal. Uplink MU-MIMO is supported by advanced wireless systems like Long Term Evolution (LTE) or IEEE 802.11ac.

Figure 1:
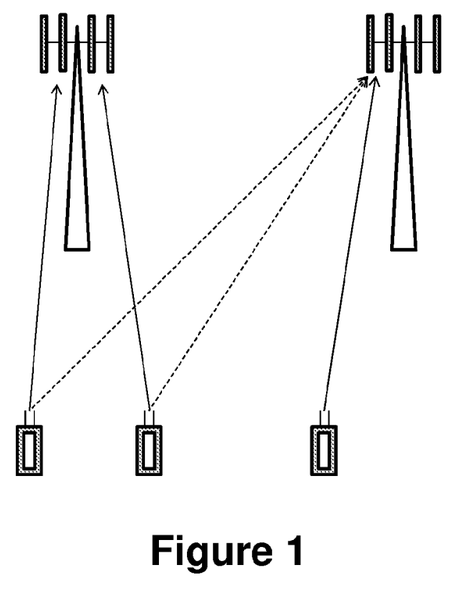
FIG. 1 shows a common situation of uplink inter-cell interference.

However, the use of interference cancellation techniques for eliminating the inter cell interference in the uplink faces significant challenges. In this case, it cannot be guaranteed that the DM-RS are orthogonal. The situation to solve is represented in FIG. 1. From said figure it can be seen that the interference originated by UEs connected to other cells may be cancelled in the serving cell basically if one of two possible situations happens:

The interference level is very low compared with the UE signal level (i.e., S/I>>0 dB). In this case, however, eliminating the interference provides reduced benefits.

The interference level is very high compared with the UE signal level (i.e., S/I<<0 dB). This situation is expected to happen only in a limited set of situations, like when an UE served by a macrocell is in the coverage area of a CSG femtocell, or a femtocell served UE operates in the Cell Range Extension (CRE) area.

The proposed invention is expected to serve UEs located in areas where none of these two situations is relevant, i.e., when the level of the UE signal and of the interference are similar. In those cases, the estimation of the channel of the interfering signal cannot be properly carried out and the result is a limited effectiveness of the interference cancellation mechanisms.

The proposed solution for overcoming this kind of problems is to extend the MU-MIMO principle to more than one cell or base station. For this to be possible, it is required to carry out the joint processing of the signals received by the different base stations and, consequently, to implement a cooperation mechanism between cells. These kinds of techniques are referred in the technical literature as CoMP (Cooperative Multipoint Transmission and Reception). CoMP, however, comes with an associated cost, which in the case of the uplink means that the quantized baseband signals should be transmitted to a common processing point.

The implementation of CoMP techniques in the uplink to overcome cell edge interference problems actually faces a number of challenges:

The use of uplink intra-cell MU-MIMO increases inter-cell interference. In the worst case scenario, the gain obtained in terms of reuse of the same resources may be lost due to the increase of intercell interference.

Inter-cell MU-MIMO would require complex coordination mechanisms between the cooperating cells, so the interference cancellation procedures can be performed. It would also require high capacity, low latency links between the cooperating cells (otherwise, it should be restricted to intra site MU-MIMO).

Inter-cell MU-MIMO would require to sacrifice part of the frequency selective scheduling gain that can be obtained with LTE as the channels to the cells involved may have completely different characteristics and the resources blocks selection cannot be optimized simultaneously.

Support of inter cell uplink CoMP joint processing would also require more advanced terminals and possibly preclude the use of legacy ones (e.g., Release 8 & 9 UEs).

The proposed invention is intended to provide similar benefits to those that can be obtained with uplink CoMP techniques but with a reduced complexity, both in the terminal and in the network. For achieving these objectives, it is proposed to use mechanism that has been extensively used for estimating the location of the mobile terminals, i.e., the reporting of radio frequency (RF) fingerprints. Moreover, the invention is compatible with both LTE and LTE Advanced radio interfaces without modifications. It may require, however, changes in the protocols.

SUMMARY OF THE INVENTION

The invention proposes a solution for facilitating the support of interference cancellation techniques in the uplink of a wireless cellular system, such as LTE, LTE Advanced, etc. by means of RF fingerprints collection by the base stations and the exchange of RF fingerprints during active calls. This mechanism would allow to solve some of the problems indicated above and would be complementary to similar mechanisms proposed for the downlink.

According to a first aspect it is provided a method for cancelling uplink interference in a wireless network, comprising as commonly in the art measuring by an interfered base station the uplink interference provoked over at least one interfered user device wirelessly connected thereto, and when said uplink interference exceeds a given threshold performing a cancellation process.

On contrary of the known proposals, and in a characteristic manner, the interfered base station to perform said cancellation process comprises the following steps:

a) discovering and identifying at least one potentially interfering serving base station to which at least one interfering user device of a plurality of interfering user devices is wirelessly connected;

b) requesting to said at least one discovered and identified potentially interfering serving base station the RF fingerprints of the one or more interfering user devices served thereby and using the same frequency resource blocks of said interfered base station;

c) receiving, as a result of said requesting, at least the RF fingerprint of said at least one interfering user device;

d) consulting said received RF fingerprint in a register which includes information regarding several RF fingerprints of other user devices and at least information regarding the level of interference caused on said interference base station when not being served thereby;

e) selecting as a result of said consulting the RF fingerprint more similar to the received one and taking the information of level of interference associated thereto; and f) using said taken level of interference information for performing said cancelling of said uplink interference.

The requested RF fingerprints of the one or more interfering user devices are also stored in the register or database and then said register is also updated. Before entering the RF fingerprints in the register or database these preferably are pre-processed, for instance by compressing their information data, in order to reduce storage requirements or coping with partial measurements. This processing would be required, for example, to select those frequency sections where no multiple-cell interference happens.

The stored RF fingerprint includes a measure of the complex frequency response of the radio channel between the user device and the base station (e.g., the outcome of the channel estimator in the base station receiver), as well as other metrics of the radio interface such as a timing advance, a location information from a user device GPS data, reports containing data from other RATs provided by the user device or information reports containing WiFi signals received by the user device. As cells from different vendors may have different outputs from the channel receiver, a common format that can be easily implemented by most if not all of them could be defined.

According to an embodiment, the measuring step is performed during idle periods of said interfered based station.

The RF fingerprints are composed preferably by several layer 1 features of the uplink connection that can be reported by the base stations, like the channel estimation, the received signal power, the applied timing advance (TA) or the scheduled modulation and coding scheme. The RF fingerprint is reported per user device and the concept managed in the invention is different to the one used for location or access control purposes.

For the support of the link between the cooperating base stations an X2 interface can be reused. However, new messages including a frame and a subframe number of the information regarding the level of interference and the frequency resource blocks (RBs) used are incorporated to support the different procedures. In an alternative implementation, a centralized architecture like Cloud RAN, where the baseband processing elements of several base stations are concentrated in a single location, can also be used meeting the requirements of the invention, without requiring the support of the X2 interface.

According to another embodiment, the discovering and the identifying of the at least one potentially interfering serving base station is performed periodically every certain period of time.

According to a second aspect it is provided a system for cancelling uplink interference in a wireless network, wherein an interfered base station comprises measuring and processing means for performing a measure of the uplink interference provoked over at least one interfered user device wirelessly connected thereto and for performing a cancellation process. On contrary of the known proposals the interfered base station is configured for implementing the method of the first aspect by means of said processing means and by means of a memory accessible thereby which stores said register.

According to a third aspect it is provided a computer program product comprising instructions that when executed in a computer are configured to perform steps a), b), d), e) and f) of the method of the first aspect.

With the proposed invention, it can be overcome the inter-cell interference, which is the main limitation for the uplink capacity in LTE systems. Moreover, the invention does not depend on the user device capabilities, e.g., it can be applied for legacy terminals that do not support uplink MIMO and the base stations that support ABS eICIC procedures will support it without significant changes. Although it has been adapted to its use in LTE, the basic principles of the invention could be applied to other similar technologies like HSUPA for instance.

Finally, the RF fingerprints stored by the base station may be reused for other purposes, like optimizing the scheduling decisions (e.g., supporting coordinated frequency selective scheduling or improving the precoding in order to minimize inter-cell interference).

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF SEVERAL EMBODIMENTS

Figure 2:
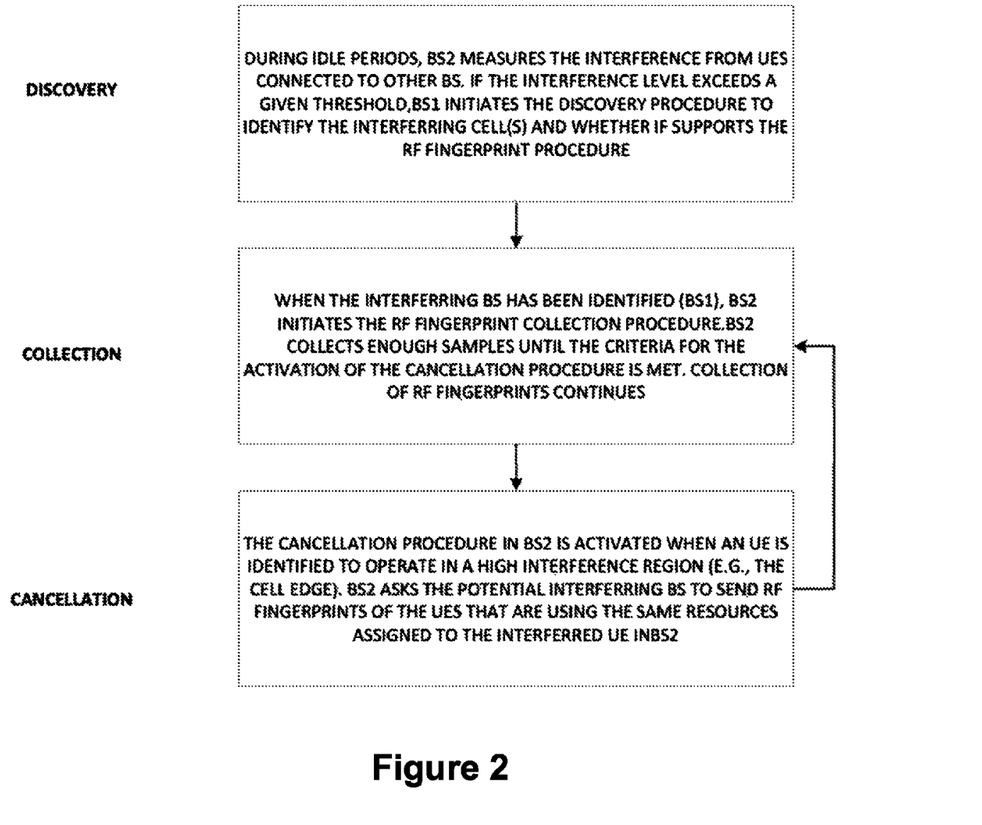
FIG. 2 is a flow chart describing the relationship of the three phases proposed by the method of the present invention according to the first aspect.

FIG. 2 shows the three phases in which the invention is structured: discovery, collection and cancellation. The discovery phase is intended to discover the base stations that can cooperate in the implementation of the proposed interference cancellation method. The collection phase is intended for the accumulation of RF fingerprints that may be used and the cancellation phase to eliminate inter-cell interference based on the RF fingerprints reported by the potentially interfering BSs. A detail explanation of each phase will now be described.

Discovery Phase:

In the discovery phase a base station that is capable of supporting uplink interference cancellation identifies the base stations which it can cooperate with. In this sense, it can (but should not necessarily) be considered an extension of the Self Organizing Network feature called Automatic Neighbour Relation (ANR). The discovery process should happen once the base station is aware with which other base stations it has an enhanced X2 interface implemented (enhanced means that is able to support the exchange of new messages indicated for the proposed invention). The base station is time and frequency synchronized with its neighbours, and knows the frame number that is being used by its neighbours.

Figure 3:
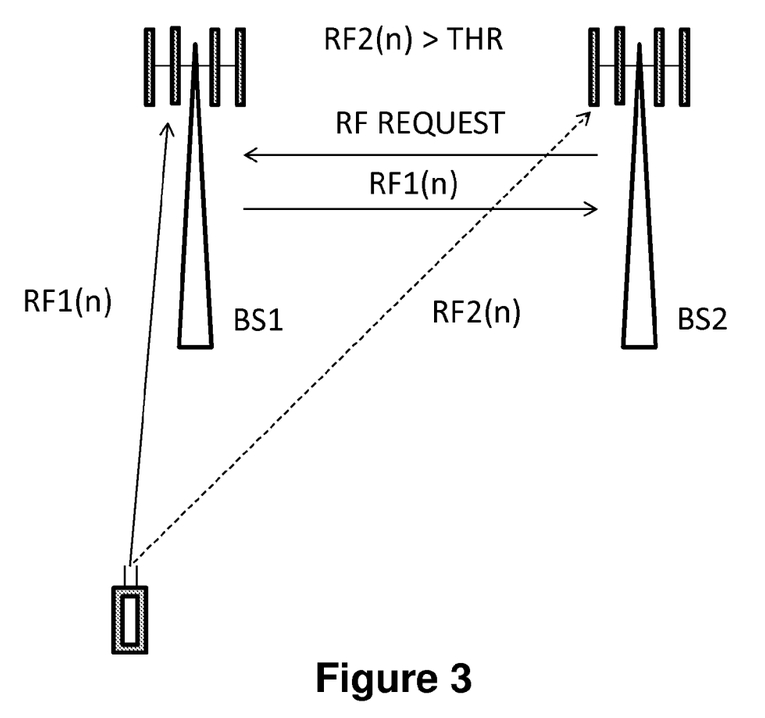
FIG. 3 is an illustration of the process that is performed during the proposed discovery phase according to an embodiment of the present invention.

In FIG. 3, when the process is initiated, the base station (BS2) uses idle periods (subframes where it has not traffic scheduled to be received or idle RBs) to carry out measurements of the UEs connected to other base stations that are using the same frequency resources. It should be noticed that BS2 has no way to know which BS the transmitting UE is connected to.

For that reason, if the signal level measured exceeds a given threshold, associated with the maximum level of interference acceptable, the BS2 sends a message to the base stations it has X2 interface available requesting information about the signal that produced the interference. The RF Request message includes the frame and subframe number of the interfering signals and the Resource Blocks (RBs) used. The base stations should, for the support of this phase, keep a record of the RF fingerprints of a relatively low number of received subframes (e.g., one frame).

Then, the asked base stations respond with a RF Response message, which generally includes several information elements:

Indication of scheduled RBs in the frame/subframe queried. If the base station did not have any UE in the RBs indicated in the Request, it reports a null value.

Channel complex frequency response per receiver antenna, as the parameters of the Digital Fourier Transform (FT) of the channel response of the Demodulation Reference Signal (DM-RS).

Received power level.

Timing advance of the transmitting UE.

Modulation and coding scheme used.

If available, information about the UE location, like those reported by the UE (if it has GPS activated) or obtained by the network.

If available, RF information from other networks (e.g., other RATs, Wi-Fi . . . ).

It can occur that several base stations may answer this message, so the querying base station has to store and process their responses in order to estimate which one is the main source for the interference. The uncertainty can be easily solved if the number of potential interferers is low and the traffic activity factor is also low.

The outcome of this phase is a list of base station that may be source of uplink interference when UEs are connected to them. These base stations constitute a RF IC Group (The procedures detailed in the next phases are limited to the members of the RF IC Group). The RF IC Group has an identifier, which should be chosen to avoid any potential uncertainty (the identifier of the cell that has initiated the discovery phase can be used for these purposes), and each BS in the group is also provided an internal identifier.

To be part of the RF IC Group, base stations have two fulfil two additional conditions:

The latency in the exchange of X2 messages between the BS and the lead RF IC Group base station should be compatible with the one required in the cancellation phase.

The base station and the lead RF IC Group BS should be time and frequency synchronized.

In this way, each base station that supports the RF fingerprint based interference cancellation should, after the discovery phase has been carried out, lead its own RF IC Group. One base station can be part of more than one RF IC Group as a cooperating one, but can only lead a RF IC Group.

The discovery phase is repeated periodically in order to determine if new base stations in the network may be cause significant interference (the BS should be aware that there are new base stations as they should be identified in the ANR SON process).

Figure 4:
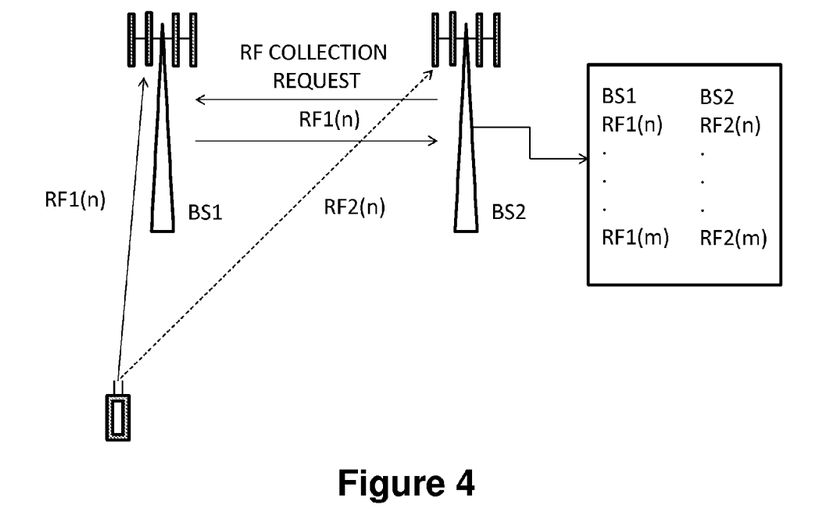
FIG. 4 is an illustration of the process that is performed during the proposed collection phase according to an embodiment of the present invention.

Collection Phase:

In this phase, also during idle periods the base station collects pairs of RF fingerprints from a single UE connected to a different base station in its RF IC Group. This phase is activated when the base station has idle or partially idle uplink subframes. The general process is illustrated in the following figure, which for sake of simplicity only two BSs, querying and queried, are represented:

The collection of RF fingerprints is activated by the querying base station sending a RF Collection Request message to all the base stations that have been identified as potential interferers in the previous phase. Two different procedures are foreseen:

Broadcast Procedure:

In the first one the message is sent to all the base stations in the RF IC Group by the lead RF IC Group base station. A broadcast address in the message header indicates that it is sent to all the base stations.

The Request sent indicates the set of frames/subframes the RF fingerprint collection will take place. This is proposed to be made by means of a bitmap, similar to the one used for the indication of Absolut Blank Subframes (ABS) for enhanced ICIC. Subframes marked with a 1 are those where the base station will measure the RF fingerprint, whilst those marked with a 0 will not be measured. The queried can select those subframes that better fir their scheduling decisions. It is in the interest of the procedure that the queried base stations do not transmit in all the subframes the base station is going to measure, so better estimations of the interference associated to a given UE are produced.

Selective Procedure:

In this case the querying base station sends different messages to each queried base station. This more advanced method would require the use of three values per subframe in the map. +1 indicates the subframe will be measured and that the queried can transmit the RF fingerprint of the UE(s) that it has scheduled in it. 0 marked subframes indicate that the querying base station will not measure the RF fingerprint. −1 marked subframes indicate that the queried BS cannot schedule UEs in it, in order to guarantee that the RF fingerprint measured in the querying base station (which corresponds to an UE connected to a third base station) is not interfered.

In the subframes that will be measured the base stations queried schedule UEs that are on the cell edge (e.g., UEs that are transmitting at full power).

In the invention, the RF fingerprint(s) to be reported fulfil a number of requirements:
  It is useful for being employed in the interference cancellation process carried out in the next phase.
  It requires a high capacity for its transmission through the modified X2 interface.
  It incorporates an estimation of the reliability of the fingerprint reported.
  It is assumed that the channel response should be constant over a subframe period.

The common part of the proposed RF fingerprint to be exchanged in response to a query is composed by two components. The first one is an estimation of the sampled channel impulse response, which a complex vector of size Nc, being the number of subcarriers.

$$\overline{h} = [h_0 h_1 h_2 \ldots h_{N_c-1}]^T$$

This vector can be estimated from the channel frequency response $\overline{H}$, as:

$$\overline{H} = \mathrm{DFT}_N(\overline{h})$$

N being the size of the FFT. The channel response can be estimated by the base station from the Reference Signals transmitted by the UE. The DFT matrix F can be defined as:

$$F = \begin{bmatrix} W_N^{0,0} & \ldots & W^{0,N_c-1} \\ \vdots & \ddots & \vdots \\ W_N^{N-1,0} & \ldots & W_N^{N-1,N_c-1} \end{bmatrix}$$

Where each matrix element is given by:

$$W_N^{i,k} = \left(\frac{1}{\sqrt{N}}\right) e^{-j2\pi\left(\frac{ik}{n}\right)}$$

Figure 5:
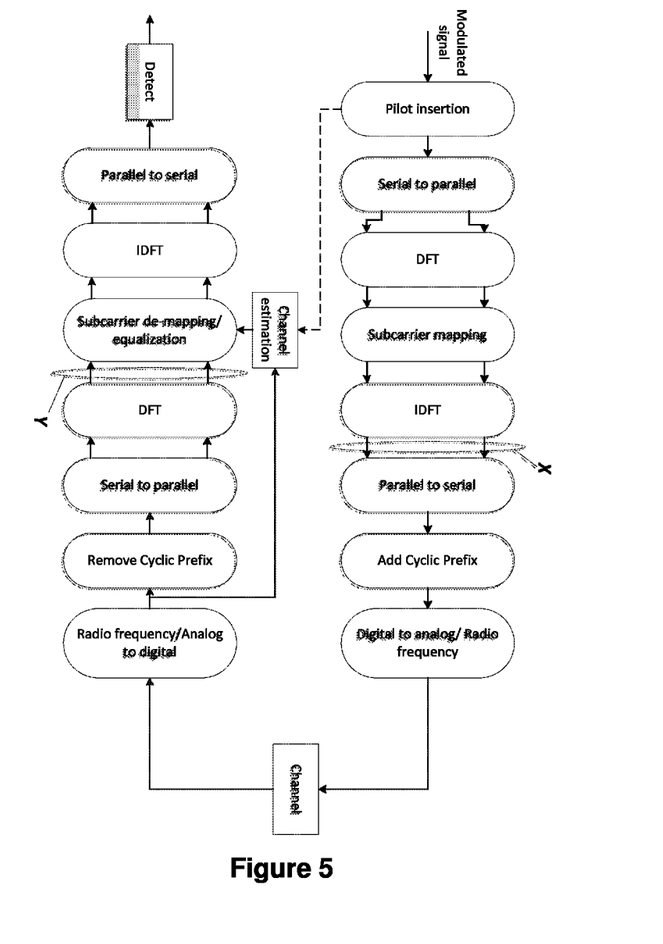
FIG. 5 is an illustration of the different modules used in a transmission-receiving procedure in a common OFDM system.

The second component is a sample of the received signal in the frequency domain Y. This can be produced as the outcome of the DFT at the receiver as indicated in FIG. 5.

The received signal Y at each BS is the result of the convolution of the input of the IDFT X in the transmitter with the channel frequency response H. Because X can change in every subframe, even if the channel remains the same, the interference generated may be different, so the channel response could be not enough to predict the interference generated. For this reason both the channel response estimation and the received signal are part of the RF fingerprint.

It should be noticed that both components to be incorporated in the RF fingerprint can be estimated and sent before the full demodulation of the signal has happened in the receiver.

Figure 6:
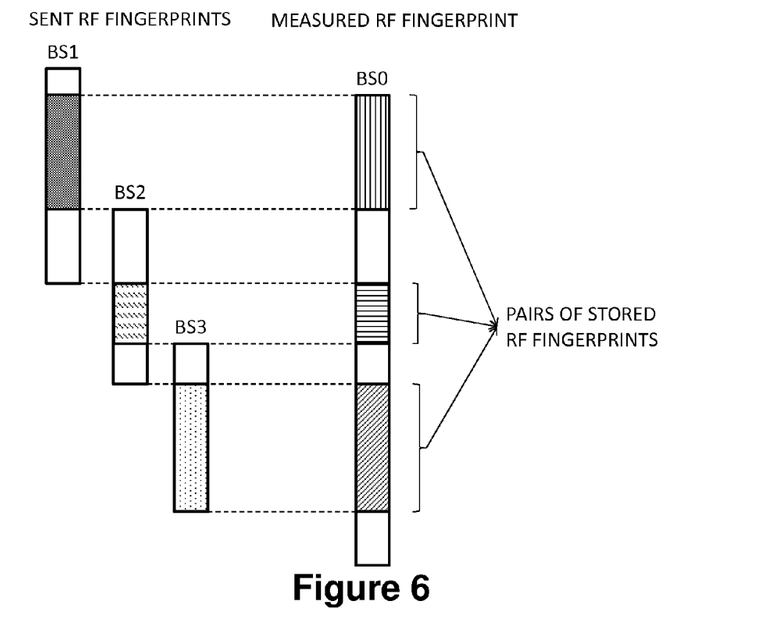
FIG. 6 is an illustration of the preprocessing that has to be done before entering the RF fingerprints in the database according to an embodiment of the present invention.

As explained before, the stored RF fingerprint in the queried base station incorporates at least the sample channel impulse response, and before entering the RF fingerprint in the register or database it can be pre-processed in order to reduce storage requirements or coping with partial measurements.

The collection phase can be coordinated to be carried out simultaneously by several base stations, in such a way that several of them schedule empty subframes simultaneously.

One of the main parameters used to control the collection process is the minimum value of the interfering signal received in BS2 that is required to collect the RF fingerprint reported by the interfering base station.

Cancellation Phase:

Finally, the cancellation phase gets activated when an UE connected to the base station is considered to be heavily interfered (this can be easily determined by the base station, when contrasting the received signal level with its quality, and the supporting procedure is not part of the proposed invention). Then, the base station may identify which are the most likely candidate base stations to provoke the interference (this is not strictly required if the number of potential interferers is relatively low). For these purposes, the invention can implement a separate process, which would rank the likelihood of the base stations in the RF IC Group to be the most interfering one.

Figure 7:
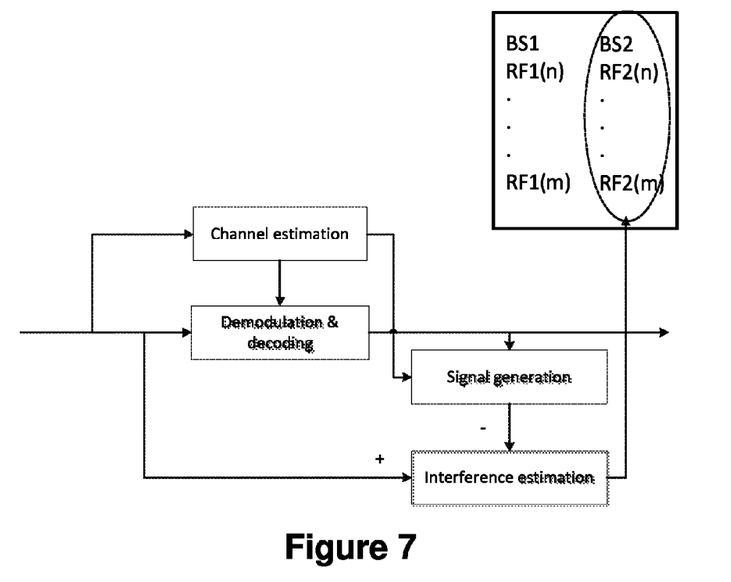
FIG. 7 is an illustration of the process to estimate the interference according to an embodiment of the present invention.

The ranking process can be based on a cost function that takes into account all the information that is available at the receiving base station or in a heuristic process. The basic factor in the function would be the similarity of the estimated interference with respect to the fingerprints stored in the compilation phase. The process to estimate the interference is represented FIG. 7.

Alternatively, another option is for the base station to use the non-scheduled UL subframes/RBs to measure the interference and compare it with the RF fingerprints in order to determine which base station the main interfering UE is connected to.

Figure 8:
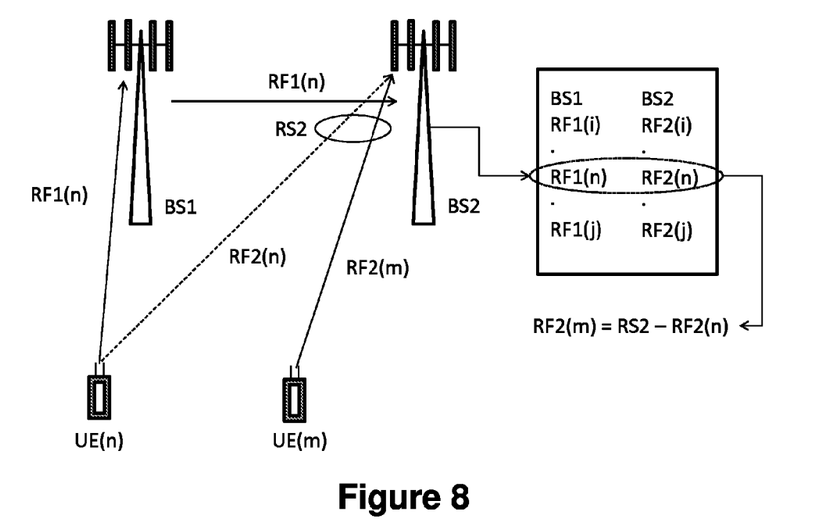
FIG. 8 is an illustration of the process that is performed when a serving BS agrees to collaborate with the interference proposed cancellation method.

Then, upon the condition of high interference being met, the base station sends a RF Cancellation Request message to the base stations that the potentially interfering UEs are connected. This message indicates the periodicity the RF fingerprints should be sent (one per each subframe or with a lower frequency). The queried base station may accept or reject the cooperation, or may propose different conditions to be applied. FIG. 8 illustrates the process for those base stations that agree to cooperate.

RF fingerprints are sent by cooperating base stations ideally every subframe, independently of whether the UE is being scheduled or not (indicating when the potentially interfering UE is not transmitting will help to verify that the base stations queried is the correct one). The latency incurred in the transmission process should be as low as possible (ideally, lower than 1 ms).

Based on the reported RF fingerprint, the base station selects the associated RF fingerprint most likely to represent the interference. This selection may take into account other information reported by the interfering cell, like the UE location information (if available) or the success rate of previous IC processes (if stored in the database). The basic mechanism, however, should be the minimization of a measure of the distance between the reported RF fingerprint and the ones stored in the base stations database. A ranking of likely fingerprints is the outcome of this process.

Figure 9:
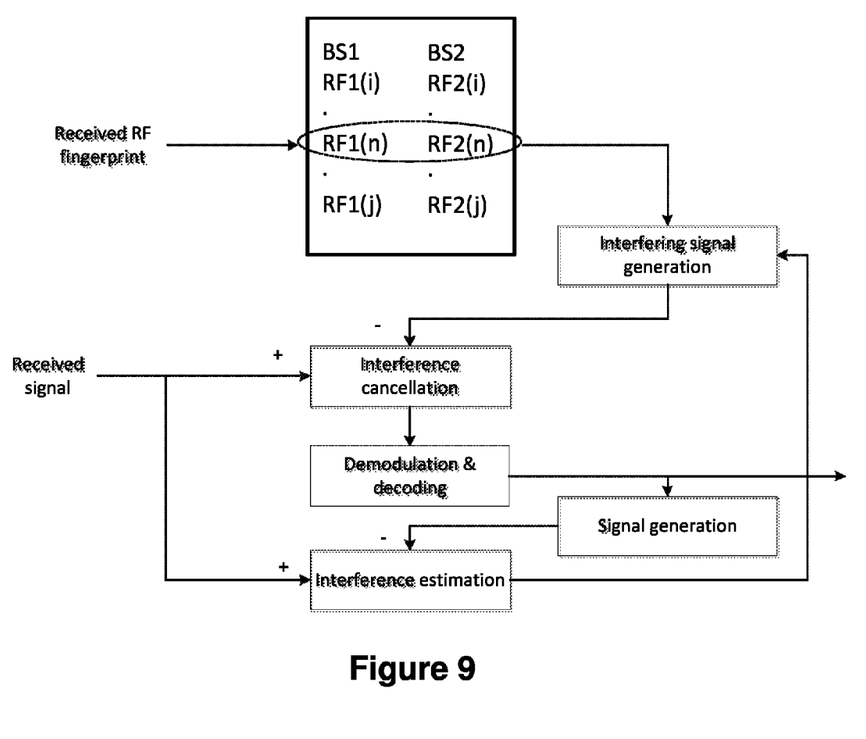
FIG. 9 is an illustration of the process that is performed once an interfering RF fingerprint has been selected.

FIG. 9 illustrates the process that is carried once the interfering fingerprint has been selected. Once the RF fingerprint that represents the interference is chosen, the interfering signal should be generated in the Interfering signal generation module. For these purposes, the module generates the channel response for the link between the UE and the reporting base stations. This can be done by convoluting the reported sampled channel by the DFT matrix. The channel response H1 and the reported sample of the received signal in the frequency domain $Y_1$ are used then for obtaining an estimation of original input signal in the frequency domain $X_1$.

$X_1$ is then convoluted by the channel response of the selected RF fingerprint $H_2$, in order to obtain an estimation of the interfering signal in the frequency domain $Y_2$.

If more than one base station is queried, the different RF fingerprints are processed in the Interfering signal generation module to produce a combined interference signal.

Figure 10:
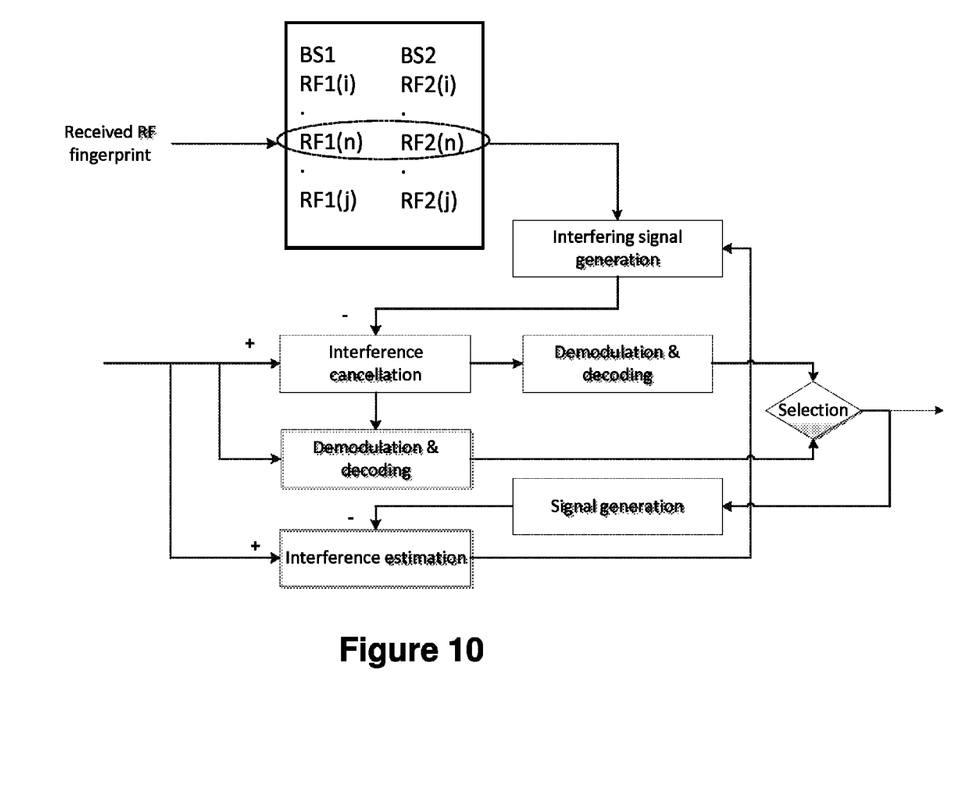
FIG. 10 is an illustration of the process that is performed by including a demodulation and decoding process of the signal before and after the interference cancellation to improve the proposed cancellation method.

The process can be improved including an additional loop, where the demodulation and decoding of the signal is performed both before and after interference cancellation, in order to prevent that the latter may result in a quality loss.

Finally, the effectiveness of the IC process is incorporated to the RF fingerprints register or database with an indication of the performance improvement achieved with the use of the interference cancellation process. It is very likely that the invention becomes more effective when the interfering UE is static or with low mobility (e.g., when it is located indoors).

In order to support the invention, the base station processing capabilities are enhanced with the incorporation of the register or database to accumulate the RF fingerprint pairs. Also, the receiver is modified to incorporate the proposed IC process.

As explained before new messages are incorporated to the X2 interface in order to support the invention in the three different phases. As X2AP has been designed as an extensible protocol, no major problems are foreseen for the support of the new messages and new information elements. However, it should be taken into account that the invention requires X2 Transport Protocol to expand in two different areas:

The new procedures required by the present invention are specific to a given UE but are not related to mobility support. It is proposed to include a new class of procedures devoted to UE operations support, which would encompass mobility support procedures. This expansion is likely to happen in order to support CoMP procedures.

Additionally, the actual version of X2 signalling transport [TS 36.422 V10.1.0 (2011-06) (Release 10)] IP layer of X2 only supports point-to-point transmission for delivering X2-AP message. The invention would benefit from the support of multicasting messages.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The invention claimed is:

1. A method for cancelling uplink interference in a wireless network, comprising measuring by an interfered base station (BS2) the uplink interference provoked over at least one interfered user device (UE2) wirelessly connected thereto, and when said uplink interference exceeds a given threshold performing a cancellation process, wherein said interfered base station (BS2) to perform said cancellation process comprises the following steps:
   a) discovering and identifying at least one serving base station (BS1) to which at least one interfering user device (UE1) of a plurality of interfering user devices is wirelessly connected;
   b) requesting to said at least one discovered and identified serving base station (BS1) the RF fingerprints of the one or more interfering user devices served thereby and using the same frequency resource blocks (RB) of said interfered base station (BS2);
   c) receiving, as a result of said requesting, at least the RF fingerprint of said at least one interfering user device (UE1);
   d) consulting said received RF fingerprint in a register which includes information regarding several RF fingerprints of other user devices and at least information regarding the level of interference caused on said interference base station (BS2) when not being served thereby;
   e) selecting as a result of said consulting the RF fingerprint more similar to the received one and taking the information of level of interference associated thereto; and
   f) using said taken level of interference information for performing said cancelling of said uplink interference.

2. A method according to claim 1, further comprising storing the requested RF fingerprints of the one or more interfering user devices and updating said register.

3. A method according to claim 1, wherein said measuring is performed during idle periods of said interfered base station (BS2).

4. A method according to claim 3, wherein said requesting is performed by means of sending a message through at least an enhanced X2 interface.

5. A method according to claim 3, wherein said requesting is performed by means of a centralized baseband processing.

6. A method according to claim 4, wherein said message sent includes a frame and a subframe number of the information regarding the level of interference and of the frequency resource blocks (RBs) used.

7. A method according to claim 6, wherein said message is sent either in a broadcast manner or in a selective manner.

8. A method according to claim 1, wherein said discovering and identifying of the at least one potentially interfering serving base station (BS1) is performed periodically every certain period of time.

9. A method according to claim 1, wherein the RF fingerprints are composed by a set of layer 1 features of the uplink connection, said set of layer 1 features being at least a radio channel estimation of said at least one interfering user device (UE1) and each of said base stations (BS1 and BS2), the information regarding the level of interference in the interfered base station (BS2), the applied timing advance (TA) of the at least one interfering user device (UE1) or the scheduled modulation and coding.

10. A method according to claim 2, wherein said RF fingerprints are pre-processed by at least compressing their information data before being stored.

11. A method according to claim 10, wherein said stored RF fingerprints include a measure of the frequency response of the radio channel.

12. A method according to claim 11, wherein said stored RF fingerprints further includes a set of metrics of the radio channel, being said set of metrics at least one of a timing advance, a location information from a user device GPS data, reports containing data from other RATs provided by the user device or information reports containing WiFi signals received by the user device.

13. A system for cancelling uplink interference in a wireless network, comprising:
   in an interfered base station (BS2), a memory and at least one hardware processor configured to execute modules comprising a measurer and processor configured to perform a measure of uplink interference provoked over at least one interfered user device (UE2) wirelessly connected thereto and to perform a cancellation process, the measurer and processor being further configured to:

measure, by said interfered base station (BS2), said uplink interference provoked over the at least one interfered user device (UE2) wirelessly connected thereto, and when said uplink interference exceeds a given threshold perform a cancellation process, wherein said interfered base station (BS2) performing said cancellation process comprises the following steps:
a) discovering and identifying at least one serving base station (BS1) to which at least one interfering user device (UE1) of a plurality of interfering user devices is wirelessly connected;
b) requesting to said at least one discovered and identified serving base station (BS1) the RF fingerprints of the one or more interfering user devices served thereby and using the same frequency resource blocks (RB) of said interfered base station (BS2);
c) receiving, as a result of said requesting, at least the RF fingerprint of said at least one interfering user device (UE1);
d) consulting said received RF fingerprint in a register which includes information regarding several RF fingerprints of other user devices and at least information regarding the level of interference caused on said interference base station (BS2) when not being served thereby;
e) selecting as a result of said consulting the RF fingerprint more similar to the received one and taking the information of level of interference associated thereto; and
f) using said taken level of interference information for performing said cancelling of said uplink interference, wherein said memory is configured to store said register.

14. A non-transitory computer readable medium storing a program causing a computer to execute a method for cancelling uplink interference in a wireless network, the method comprising:

measuring by an interfered base station (BS2) the uplink interference provoked over at least one interfered user device (UE2) wirelessly connected thereto, and when said uplink interference exceeds a given threshold performing a cancellation process, wherein said interfered base station (BS2) to perform said cancellation process comprises the following steps:
a) discovering and identifying at least one serving base station (BS1) to which at least one interfering user device (UE1) of a plurality of interfering user devices is wirelessly connected;
b) requesting to said at least one discovered and identified serving base station (BS1) the RF fingerprints of the one or more interfering user devices served thereby and using the same frequency resource blocks (RB) of said interfered base station (BS2);
c) receiving, as a result of said requesting, at least the RF fingerprint of said at least one interfering user device (UE1);
d) consulting said received RF fingerprint in a register which includes information regarding several RF fingerprints of other user devices and at least information regarding the level of interference caused on said interference base station (BS2) when not being served thereby;
e) selecting as a result of said consulting the RF fingerprint more similar to the received one and taking the information of level of interference associated thereto; and
f) using said taken level of interference information for performing said cancelling of said uplink interference.

\* \* \* \* \*